United States Patent
Hill et al.

(10) Patent No.: US 6,435,165 B1
(45) Date of Patent: Aug. 20, 2002

(54) REGULATION METHOD FOR FUEL INJECTION SYSTEM

(75) Inventors: Raymond John Hill, Beldon; Luke Newman Henry Andersen, Greenwood; Keith Melbourne, Mount Hawthorn, all of (AU)

(73) Assignee: Orbital Engine Company (Australia) Pty Limited, Balcatta (AU)

( * ) Notice: Subject to any disclaimer, the term of this patent is extended or adjusted under 35 U.S.C. 154(b) by 0 days.

(21) Appl. No.: 09/744,995

(22) PCT Filed: Aug. 20, 1999

(86) PCT No.: PCT/AU99/00673
§ 371 (c)(1),
(2), (4) Date: Apr. 30, 2001

(87) PCT Pub. No.: WO00/11343
PCT Pub. Date: Mar. 2, 2000

(30) Foreign Application Priority Data

Aug. 21, 1998 (AU) .............................. PP5410

(51) Int. Cl.⁷ .......................... F02M 23/04; F02M 23/12
(52) U.S. Cl. .................... 123/531; 123/533; 123/479
(58) Field of Search .................... 123/531, 533, 123/479

(56) References Cited

U.S. PATENT DOCUMENTS

| | | | | |
|---|---|---|---|---|
| 5,115,786 A | * | 5/1992 | Yamada | 123/531 |
| 5,150,692 A | | 9/1992 | Trombley et al. | 123/533 |
| 5,289,812 A | | 3/1994 | Trombley et al. | 123/533 |
| 5,730,108 A | * | 3/1998 | Hill | 123/531 |
| 5,848,582 A | * | 12/1998 | Ehlers et al. | 123/531 |
| 6,164,268 A | * | 12/2000 | Worth et al. | 123/533 |
| 6,314,948 B1 | * | 11/2001 | Cathcart | 123/479 |
| 6,357,422 B1 | * | 3/2002 | Doane et al. | 123/533 |

FOREIGN PATENT DOCUMENTS

EP 0 748 929 12/1996

* cited by examiner

Primary Examiner—Erick Solis
(74) Attorney, Agent, or Firm—Arent Fox Kintner & Kahn

(57) ABSTRACT

A method of regulating gas pressure in a dual fluid fuel injection system for an internal combustion engine having at least one delivery injector, including;

determining when the gas pressure supplied to the fuel injection system is above a desired level; and opening the at least one delivery injector of the dual fluid fuel injection system for a determined duration when the gas pressure is above the desired level to allow gas to be passed through the delivery injector and thereby regulate the gas pressure of the supplied gas.

19 Claims, 3 Drawing Sheets

REGULATION METHOD FOR FUEL INJECTION SYSTEM

The present invention is generally directed to dual fluid fuel injection systems for internal combustion engines, and in particular to a method of regulating air pressure for such dual fluid fuel injection systems. The present invention is applicable for both two and four stroke engines and may be adapted for use on both single and multicylinder engines.

Dual fluid fuel injection systems typically utilise compressed air during the injection event to entrain metered quantities of fuel for delivery into the combustion chambers of an internal combustion engine. The Applicant has developed such fuel injection systems and one version thereof is described in U.S. Pat. No. 4,934,329, the details of which are incorporated herein by reference. Generally, a source of compressed gas, for example an air compressor, is required for these fuel injection systems to operate. The term "air"is used herein to refer not only to atmospheric air, but also to other gases including air and exhaust gas or fuel vapour mixtures.

Such systems typically require the pressure of the compressed air to be regulated to thereby help to maintain accurate control of the fuel delivery to the engine. Various means may be used to regulate the air pressure from the compressed air source. One common method of regulating the air pressure of the compressed air supplied to the fuel injection system relies on the use of suitably located mechanical air regulators within the air delivery circuit. In such systems, regulation of the air pressure can however be lost if there is a mechanical failure of the air regulator(s).

Another possible method of regulating the air pressure supplied to the fuel injection system is by use of a demand compressor which is able to control the pressure of the output air delivered therefrom. Typically, such a demand compressors seek to closely match the air delivered therefrom to the actual requirements of the apparatus or system to which air under pressure is being supplied. Accordingly, in certain applications, such a compressor may eliminate the need for any further means to regulate the air pressure. However, under certain operating conditions or as a result of a particular failure mode which may occur, the demand compressor may deliver more air than is required to, for example, a dual fluid fuel injection system. For example, under cold ambient conditions, the battery voltage for the system may be significantly lower than normal, typically 12V. Depending upon the actual configuration of the demand compressor, it is possible in these conditions for there to be an insufficient voltage to satisfactorily operate a pressure control arrangement of the demand compressor. This could lead to the supply of excess compressed air resulting in an undesirable or excessive pressure condition within the fuel injection system if no other air regulation means is provided. It would therefore be advantageous to be able to maintain regulation of the air pressure in such systems when such a pressure control arrangement of the demand compressor fails or is not operating properly.

It is therefore an object of the present invention to provide a method of regulating the gas pressure in a dual fluid fuel injection system that avoids at least one of the abovenoted disadvantages.

With this in mind, there is provided a method of regulating gas pressure in a dual fluid fuel injection system for an internal combustion engine having at least one delivery injector during running of the engine, including;

determining when the gas pressure supplied to the fuel injection system is above a desired level; and opening the at least one delivery injector of the dual fluid fuel injection system for a determined duration when the gas pressure is above the desired level to allow gas to be passed through the delivery injector and thereby regulate the gas pressure of the supplied gas.

The running of the engine includes engine operation during engine cranking, start up, over-run cut operating states as well as other running states such as idle or various states of engine load where the engine is driving a vehicle or other apparatus.

The opening of the delivery injector results in a reduction in the gas pressure within the fuel injection system, the degree of reduction being a function of the duration and/or timing of opening of the injector. Conveniently, gas is supplied to the fuel injection system by way of an air compressor which in certain applications may be driven off the engine.

The dual fluid fuel injection system may include one or more delivery injectors. The or each injector may be arranged to inject directly into a cylinder of the engine, and one or more injectors may be opened at the same time to relieve gas pressure within the fuel injection system. The present invention is therefore equally applicable for engines having one or more cylinders.

The duration of opening of the or each injector may be sufficient to allow the gas pressure to return to or at least approach the desired level. Conveniently, the or each injector is controlled over successive cycles to gradually or incrementally reduce the gas pressure in the fuel injection system down to the desired level. In the case of a multicylinder engine, one or a number of the injectors may be selected to perform the gas pressure regulation function. Further, in relation to the operation of one, some or all of the injectors to perform the gas pressure regulation function, it is to be understood that successive cycles doesn't necessarily constitute consecutive cycles.

The timing of the opening of the, some, or each of the injectors for regulation of the gas pressure may conveniently be between the normal fuel injection events of the injector. Hence, the opening of the injector(s) to effect gas pressure reduction in the fuel injection system may occur(s) at timings at which the air injectors would not normally be open for fuel delivery. Nonetheless, in certain applications, the control of the injector(s) for gas pressure regulation may be immediately before, after, or in some cases may overlap slightly with a fuel delivery event.

Preferably, the opening of the injector(s) for gas pressure regulation will be effected at a point in time at which the pressure in the corresponding cylinder is lower than the gas pressure within the fuel injection system. Accordingly, the timing of opening of the injector(s) as well as the duration of opening may be used to affect gas pressure regulation. That is, opening an injector for the same period of time, but, for example, at a point in the cylinder cycle when the cylinder pressure is lower will typically result in a greater decrease of the gas pressure within the fuel injection system.

Conveniently, in the case of engines operating on the four stroke cycle, the injector(s) may be controlled to relieve gas pressure during the latter part of the power/expansion stroke and certain parts of the intake and/or exhaust stroke. Conveniently, in the case of engines operating on the two stroke cycle, the injector(s) may be controlled to relieve gas pressure during certain parts of the exhaust/intake event (ie. during latter parts of the power stroke) and/or an initial portion of the compression stroke. The present invention is therefore equally applicable to engines operating on both the two and four stroke cycles.

The opening of the injector(s) may be controlled by an Electronic Control Unit (ECU) controlling the operation of the engine. Conveniently, the ECU may determine the gas pressure of the compressed gas supplied to the fuel injection system by means of a suitably located pressure sensor. The fuel injection system may include an air rail for supplying gas to the injector(s) and to which the compressed gas is supplied. The pressure sensor may, for example, be located to measure the air pressure within the air rail. Hence, the air pressure sensor is one means by which the gas pressure in the fuel injection system may be assessed to see if it is above the desired level.

The ECU may determine a desired level for the air pressure within the fuel injection system and may periodically compare, by way of the pressure sensor, the actual measured gas pressure with the determined desired level. If the measured gas pressure is at least substantially the same as the desired level, then the ECU will take no further action to regulate the gas pressure. If the measured gas pressure is however above the desired level, then the ECU may determine a desired timing and duration of opening of the injector(s) to seek to reduce the gas pressure within the fuel injection system back towards or to the desired level. Hence, use of such an air pressure sensor in the fuel injection system provides for closed loop control of the gas pressure within the fuel injection system.

In particular, the ECU may determine the magnitude of the pressure difference between the actual gas pressure in the fuel injection system and the desired level, and may measure the engine speed. The ECU may include a "look-up" map or other computational means to determine the required "start of air" (SOA), being the start of the opening of the injector, and the required duration of opening of the injector for a particular engine speed to thereby achieve the required drop in gas pressure. The next viable "window" when it is possible to open the injector is then determined, and the injector may then be actuated during that window. The gas pressure may be measured after the actuation of the injector and the above described procedure repeated until the air pressure reaches the desired level.

As an alternative to including a pressure sensor, the method according to the present invention may simply rely on some means to detect that the compressor is delivering more air than is required. For example, the ECU may be configured to determine the pressure of the air delivered by the compressor in direct proportion to the engine speed and hence may be able to determine when more air than is required is being delivered and approximately how much pressure requires to be relieved. On the basis of this known relationship, the ECU could then actuate the injector(s) as described hereinbefore to reduce the gas pressure within the fuel injection system. This provides for control of the air pressure within the fuel injection system which eliminates the need for a pressure sensor for providing a "feedback" signal. Such an open loop type control arrangement is particularly suitable for small engine applications such as in scooters where it can be uneconomic to include a pressure sensor in the engine. In certain applications, the determination of how much gas pressure is being delivered by the compressor for a particular engine speed may be taken into account when an engine is initially calibrated. That is, in operation, the achievement of a particular speed and/or load condition will result in the selection of a predetermined duration and/or timing of opening of the air or delivery injectors of the dual fluid fuel injection system. Hence, the relationship between engine speed and/or load and the pressure of the gas supplied by the compressor may be taken account of at the time of calibrating the engine and no separate intermediate step may thus be necessary during actual engine operation (ie: the relationship may have already been allowed for).

The regulation method according to the present invention can further be used with a dual fluid fuel injection system having an air regulator for regulating the gas pressure under normal conditions. If there is a mechanical failure of the air regulator, the regulation method could be used as an alternative means of regulation or in a "limp home" mode of operation of the engine to thereby effect any necessary gas pressure regulation in the fuel injection system until such times as the air regulator can be repaired or replaced.

A further application of the invention may exist under over-run conditions, for example when a vehicle is coasting down a hill and no fuel is required to be injected. In a dual fluid fuel injection system, such an over-run cut condition is effected by not activating the air or delivery injectors of the system. As a consequence of this, a majority or all of the air supplied to the fuel injection system by the compressor may need to be dumped by the air regulator. Such regulators are normally designed to dump only a portion of the compressed air supplied by the compressor and typically only function properly when such a portion of air is flowing therethrough. The regulation method according to the present invention can hence reduce the stress on the regulator by allowing some air pressure to be relieved through the delivery injectors.

The regulation method can alternatively be used with a dual fluid fuel injection system where it is endeavoured to control the gas pressure to that which is required or used by the engine, such as where gas pressure regulation is by way of a demand compressor as alluded to hereinbefore. For example, the regulation method of the present invention may be used if the demand compressor is unable to operate properly due to significantly low voltages which may occur under, for example, cold engine cranking conditions.

The regulation method may also be used to control gas pressure in small engines which do not have a dedicated pressure sensor for determining the gas pressure and which are designed to operate under open loop control.

It will be convenient to further describe the invention with respect to the accompanying drawings which illustrate a preferred embodiment of the present invention. Other embodiments of the invention are possible, and consequently, the particularity of the accompanying drawings is not to be understood as superseding the generality of the preceding description of the invention.

Figure 1:
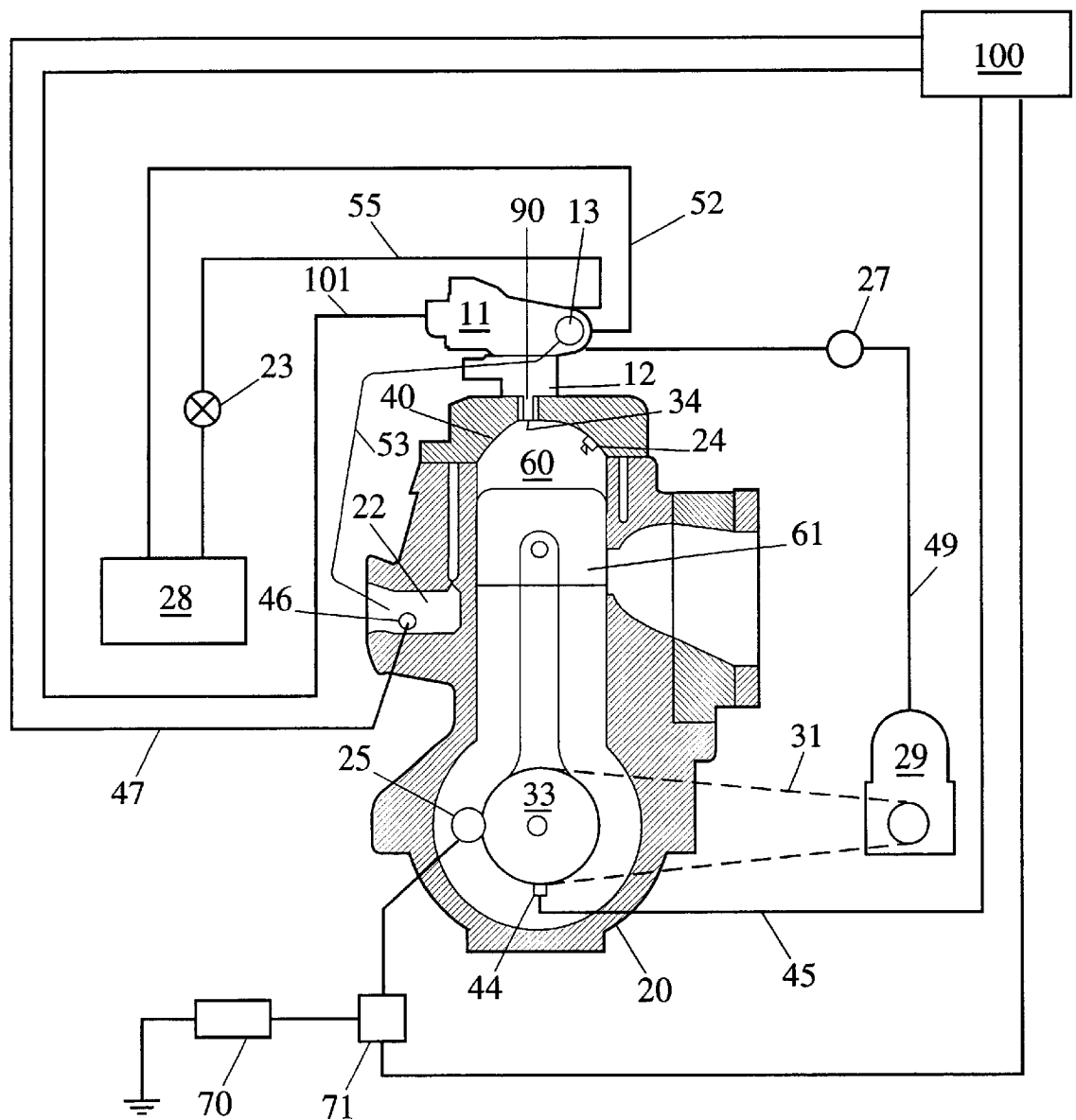
FIG. 1 is a schematic partial cross-sectional view of an internal combustion engine having a dual fluid fuel injection system.

FIG. 1 shows an internal combustion engine 20 comprising a fuel injection system, the engine 20 having an air intake system 22, an ignition means 24, a fuel pump 23, and a fuel reservoir 28. The engine 20 further includes an electric starter motor 25 energised by a battery 70 upon operation of a starter switch 71. An air compressor 29 is driven off an engine crankshaft pulley 33 by way of a belt 31. Mounted in a cylinder head 40 of the engine 20 is a fuel and air rail unit 11. The fuel pump 23 draws fuel from the fuel reservoir 28 which is then supplied to the fuel and air rail unit 11 through a fuel supply line 55.

Figure 2:
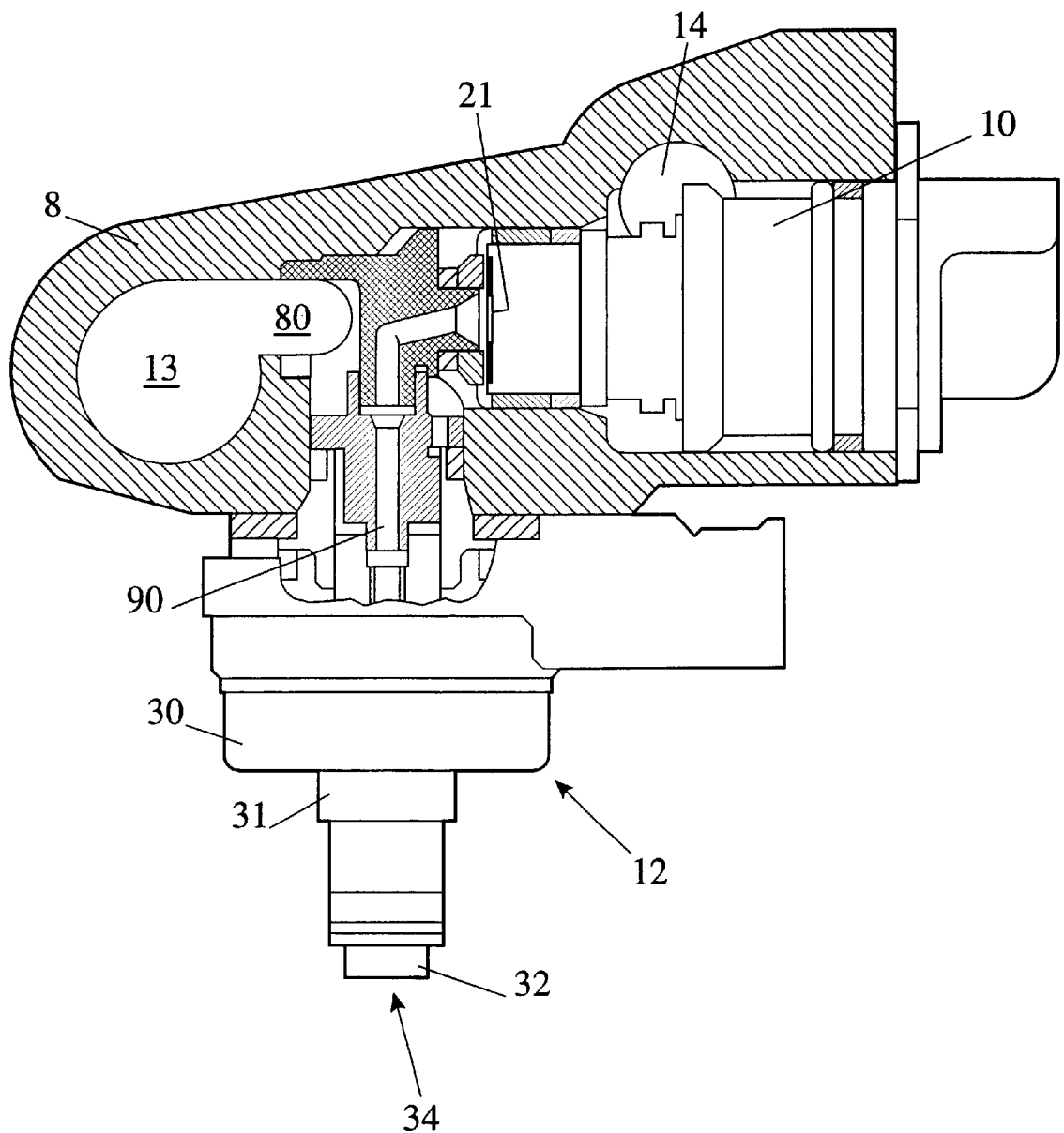
FIG. 2 is a partial cross-sectional view of a typical form of a metering and injector rail unit used on the engine shown in FIG. 1.

Referring now to FIG. 2, there is shown in detail the fuel and air rail unit 11 comprising a fuel metering unit 10 and an air or delivery injector 12 for the or each cylinder of the engine 20. The invention is equally applicable to single cylinder configurations and multi-cylinder engines of any number of cylinders. The body 8 of the fuel and air rail unit 11 is an extruded component with a longitudinally extending air duct 13 and a fuel supply duct 14.

At appropriate locations, there are provided connectors and suitable ducts communicating the rail unit 11 with air and fuel supplies: duct 49 communicating air duct 13 with the air compressor 29; duct 53 providing an air outlet which returns air to the air intake system 22; and duct 52 communicating the fuel reservoir 28 and fuel supply duct 14 providing a fuel return passage. The air duct 13 communicates with a suitable air regulator 27 which regulates the air pressure of the compressed air provided by the air compressor 29 to the air duct 13. The air regulator 27 may in certain applications be arranged on the rail unit 11 itself.

The fuel metering unit 10 is commercially available and requires no detailed description herein. Suitable ports are provided to allow fuel to flow through the unit 10 and a metering nozzle 21 is provided to deliver fuel to a passage 90 and thence to the air injector 12.

The air injector 12 has a housing 30 with a cylindrical spigot 31 projecting from a lower end thereof, the spigot 31 defining an injection port 32 communicating with the passage 90. The injection port 32 includes a solenoid operated selectively openable poppet valve 34 operating in a manner similar to that as described in the Applicant's U.S. Pat. No 4934329, the contents of which are hereby incorporated by reference. As seen in FIG. 1, energisation of the solenoid in accordance with commands from an electronic control unit (ECU) 100 opens the valve 34 to deliver a fuel-gas mixture to a combustion chamber 60 of the engine 20. However, it is not intended to limit the valve construction to that as described above and other valves, for example, pintle valve constructions, could be employed.

Returning to FIG. 1, the electronic control unit (ECU) 100 receives signals from a crankshaft speed and position sensor 44 of suitable type known in the art via the lead 45 and from an air flow sensor 46 located in the air intake system 22 via the lead 47. The ECU 100, which may also receive signals indicative of other engine operating conditions such as the engine temperature and ambient temperature (not shown), determines from all input signals received the quantity of fuel required to be delivered to each of the cylinders of the engine 20. This general type of ECU is well known in the art of electronically controlled fuel injection systems and will not be described here in further detail.

Opening of each injector valve 34 is controlled by the ECU 100 via a respective lead 101 in timed relation to the engine cycle to effect delivery of fuel from the injection port 32 to combustion chamber 60 of the engine 20. By virtue of the two fluid nature of the system, fuel is delivered to the cylinder entrained in a gas. In this regard, it is important that the pressure of the gas, particularly air, employed to entrain the fuel and deliver it in the form of an atomised dispersion, is at a predetermined pressure to create the desired degree of atomisation. Therefore appropriate regulation of the air pressure is necessary.

The passage 90 is in constant communication with the air duct 13 via the conduit 80 as shown in FIG. 2 and thus, under normal operation, is maintained at a substantially steady air pressure. Upon energising of the solenoid of the air injector 12, the valve 34 is displaced downwardly to open the injection port 32 so that a metered quantity of fuel is carried by air through the injection port 32 into the combustion chamber 60 of a cylinder of the engine 20.

Typically, the air injector 12 is located within the cylinder head 40 of the engine 20, and is directly in communication with the combustion chamber 60 defined by the reciprocation of a piston 61 within the engine cylinder. As above described, when the injection port 32 is opened and the air supply available via the conduit 80 is above the pressure in the engine cylinder, air will flow from the air duct 13 through the passage 80, passage 90 and, entrained with fuel, injection port 32, into the engine combustion chamber 60.

In the arrangement shown in FIGS. 1 and 2, the air pressure is regulated by the air regulator 27. Alternative air regulation means as alluded to hereinbefore are however also possible.

The air injector 12 may be controlled by the ECU 100 to regulate the air pressure in the air duct 13 according to the present invention if, for example, the regulator 27 has failed. One or a number of air injectors 12 may be used to effect the pressure regulation process and the air injector(s) 12 may be actuated over successive cycles in any predetermined order until the gas pressure in the fuel injection system has been suitably relieved. Similarly, where pressure regulation is via an alternative means and due to the unsatisfactory or incorrect operation of such regulation means, too much air is delivered to the fuel injection system, the air injector(s) 12 may be used to regulate the pressure in the air duct 13.

Figure 3:
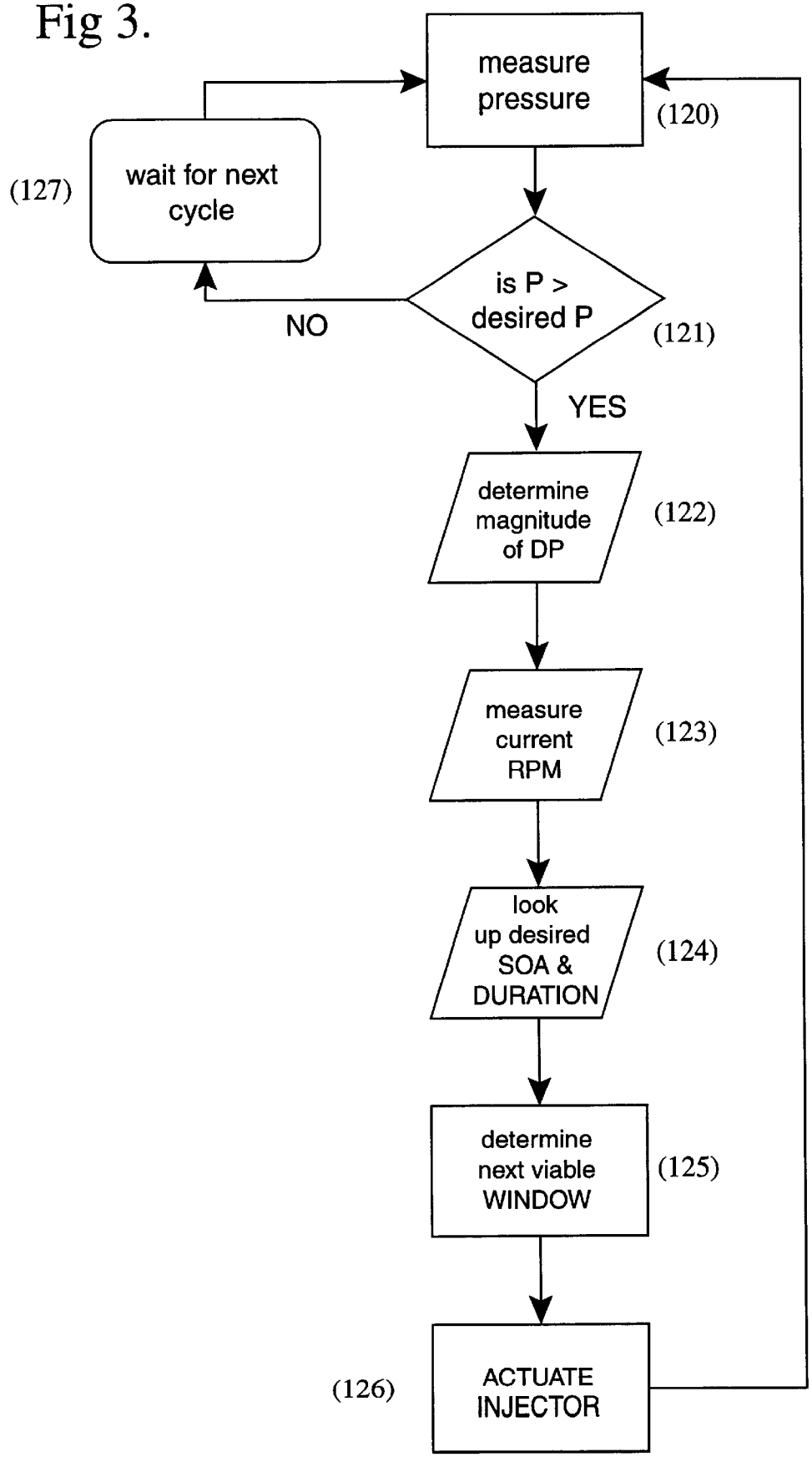
FIG. 3 is a flow chart showing a preferred embodiment of the method according to the present invention.

Referring to FIG. 3 which shows one possible control procedure provided by the ECU 100, the pressure within the fuel and air rail unit 1 1 and typically within the air duct 13 is periodically measured (step 120). The air pressure may for example be measured by a pressure sensor (not shown) supported at an appropriate location on the fuel and air rail unit 11. However, and as alluded to hereinbefore, other means for determining that the gas pressure within the fuel injection system is too high may employed.

If the measured air pressure is substantially equal to the desired air pressure for correct operation of the fuel injection system (step 121), then no further action is taken by the ECU 100 to regulate the air pressure, and the ECU 100 waits for the next cycle (step 127) before next measuring the air pressure (step 120) in the fuel injection system.

If however the measured air pressure is greater than the desired pressure (step 121), then the magnitude of the differential pressure between the measured air pressure and the desired air pressure is determined (step 122). Furthermore, the current speed of the engine is measured (step 123). On the basis of this information, the ECU 100 opens an or the air injector 12 to regulate the air pressure supplied to the fuel and air rail unit 11.

The ECU 100 firstly determines the start of air (SOA) and duration of the period of opening for the air injector 12 (step 124). This information may be obtained from a look-up map provided in the ECU 100. The next viable window during which the air injector 12 may be opened without effecting the operation of the engine is determined (step 125). This window may be between respective air injection events of the injector 12 and will typically be different to the timing at which the air injector 12 is normally opened to affect fuel delivery to the engine 20. Further, this will typically occur at a point in the engine cylinder cycle when the cylinder pressure is less than the gas pressure in the fuel injection system.

Finally, the air injector 12 is actuated (step 126) on the basis of the determined operational criterias. In this way, gas pressure may be relieved from the fuel injection system into a cylinder of the engine 20. The pressure within the fuel and air rail unit 11 is then again measured (step 120) and the operational procedure repeated as required until the gas pressure has been returned to the desired level.

The fuel injection system shown in FIG. 1 includes an air regulator 27 located on the air supply line 49. This air regulator 27 regulates the air pressure of the air delivered from the air compressor 29 to the fuel and air rail unit 11. As mentioned, the method according to the present invention can be utilised when the air regulator malfunctions to provide a "limp-home"mode of operation. It is also envisaged that the method according to the present invention may be the sole means of regulating the air pressure to the fuel and air rail unit 11. Such a system may be advantageous in certain low cost applications as the pressure regulation method does not require any additional components such as regulators or pressure relief valves. Rather, the method can be implemented relative easily by additional software in the ECU which is already present to control, amongst other things normal operation of the air injectors 12 for fuel delivery to the engine 20.

Further, as a result of pressure regulation being affected by way of the present invention, in certain applications and under certain circumstances, a quantity of "fuel hang-up"which may be present in the air injector 12 after a fuel delivery event may also be delivered into the engine cylinder. Depending upon the timing of the opening of the air injector 12 in the engine cylinder cycle, this small quantity of fuel may be used to some advantage or may instead be subsequently exhausted from the engine resulting in some increase in hydrocarbon emissions. The controlling of the air injectors 12 to effect pressure regulation according to the present invention may of course be carried out so as to minimise the effect of such fuel hang-up quantities on the operation of the engine.

By way of the present invention, the fuel injection system may be made to operate with satisfactory pressure regulation in the event of a failure or in-effective operation of the compressor 29 or regulator 27 as has been discussed hereinbefore. Accordingly, this eliminates the undesired consequence of the gas pressure rising to a level sufficient to force open the air injectors 12 leading to uncontrolled operation of the engine 20. In it's simplest form, the method of the present invention can be implemented such that the pressure within the fuel injection system is limited hence avoiding this undesirable consequence.

The method according to the present invention is applicable to both two stroke and four stroke engines incorporating dual fluid injection systems. Modifications and variations as would be deemed obvious to the person skilled in the art are included within the ambit of the present invention.

What is claimed is:

1. A method of regulating gas pressure in a dual fluid fuel injection system for an internal combustion-engine having at least one delivery injector during running of the engine, including;

determining when the gas pressure supplied to the fuel injection system is above a desired level; and opening the at least one delivery injector of the dual fluid fuel injection system for a determined duration when the gas pressure is above the desired level to allow gas to be passed through the delivery injector and thereby regulate the gas pressure of the supplied gas.

2. A method according to claim 1 including controlling the timing of opening of the at least one delivery injector.

3. A method according to claim 1, wherein the dual fluid fuel injection system includes a plurality of said delivery injectors, including applying said method by way of one or more of the delivery injectors.

4. A method according to claim 1, including controlling the at least one injector over successive cycles to gradually reduce the gas pressure in the fuel injection system down to the desired level.

5. A method according to claim 1 including timing the opening of the at least one delivery injector between normal fuel injection events of the injector.

6. A method according to claim 1, including timing the opening of the at least one delivery injector to between normal fuel injection events of t the injector, and slightly overlapping one of said fuel injection events.

7. A method according to claim 1, wherein the at least one 13 delivery injector is in direct communication with a cylinder of the engine, the opening of the delivery injector for gas pressure regulation being effected at a point in time at which the pressure in the cylinder is lower than the gas pressure within the fuel injection system.

8. A method according to claim 1, wherein the engine operates on a four stroke cycle, the method including controlling the injector to relieve gas pressure during the latter part of the expansion stroke and certain parts of the intake and/or exhaust stroke.

9. A method according to claim 1, wherein the engine operates on a two stroke cycle, the method including controlling the injector to relieve gas pressure during the latter parts of the exhaust/intake stroke and/or the initial portion of the compression stroke.

10. A method according to claim 1, wherein the fuel injection system further includes an Electronic Control Unit for controlling the opening of the at least one injector and a pressure sensor for measuring the gas pressure within the fuel injection system and providing a pressure signal to the Electronic Control Unit.

11. A method according to claim 1 wherein said method provides for closed loop control of the pressure regulation.

12. A method according to claim 1 wherein the opening of the at least one injector is controlled by an Electronic Control Unit which controls the at least one injector as a function of an engine operating parameter related to the gas pressure of the supplied gas.

13. A method according to claim 12, wherein an engine driven compressor supplies gas to the engine, and the engine operating parameter is the engine speed.

14. A method according to claim 1 wherein said method provides for open loop control of pressure regulation.

15. A method according to claim 1 including using said method until the gas pressure is at least substantially at the desired level.

16. A method according to claim 1 including using said method during normal engine operation.

17. A method according to claim 1 including using said method during engine cranking and start-up.

18. A method according to claim 1, including applying said method during an over run cut mode of operation of the engine.

19. A method according to claim 1, including applying said method during a limp home mode of operation of the engine.

* * * * *